United States Patent
Leblanc

(10) Patent No.: US 11,048,801 B2
(45) Date of Patent: Jun. 29, 2021

(54) METHOD AND APPARATUS FOR SECURE COMPUTING DEVICE START UP

(71) Applicant: Sierra Wireless, Inc., Richmond (CA)

(72) Inventor: Lawrence Joseph Leblanc, Burnaby (CA)

(73) Assignee: SIERRA WIRELESS, INC., Richmond (CA)

(*) Notice: Subject to any disclaimer, the term of this patent is extended or adjusted under 35 U.S.C. 154(b) by 655 days.

(21) Appl. No.: 15/938,701

(22) Filed: Mar. 28, 2018

(65) Prior Publication Data

US 2018/0285570 A1 Oct. 4, 2018

Related U.S. Application Data

(60) Provisional application No. 62/477,808, filed on Mar. 28, 2017.

(51) Int. Cl.
*G06F 21/57* (2013.01)
*H04L 9/32* (2006.01)
(Continued)

(52) U.S. Cl.
CPC ............ *G06F 21/575* (2013.01); *B28C 7/024* (2013.01); *B28C 7/0418* (2013.01);
(Continued)

(58) Field of Classification Search
CPC ... H04L 9/0825; H04L 9/0861; H04L 9/0891; H04L 9/321; H04L 9/3247; H04L 9/3263;
(Continued)

(56) References Cited

U.S. PATENT DOCUMENTS 6,766,353 B1* 7/2004 Lin .................... G06F 21/64
709/201
7,359,881 B2* 4/2008 Stefik .................. G06Q 10/101
705/51

(Continued)

FOREIGN PATENT DOCUMENTS

CN 103927490 A 7/2014
CN 105224875 A 1/2016
(Continued)

OTHER PUBLICATIONS

Nystrom et al., RFC 2986—PKCS #10: Certification Request Syntax Specification Version 1.7, The Internet Society, 2000.*
(Continued)

*Primary Examiner* — Minh Dinh
(74) *Attorney, Agent, or Firm* — Thompson Coburn LLP

(57) ABSTRACT

The present invention provides methods and devices for secure computing device start up. The method includes generating a public/private key pair and signing a software image and obtaining a first time stamp and a second time stamp. The method further includes combining the signed software image, the first time stamp and the second time stamp into a bundle and deploying the bundle. During secure start up, the method includes authenticating the signed software image, the first time stamp and the second time stamp and booting the computing device if authentication passes. The computing device aborts booting the computing device if the authentication process fails.

15 Claims, 4 Drawing Sheets

(51) Int. Cl.
  *H04L 9/08* (2006.01)
  *B28C 7/02* (2006.01)
  *B28C 7/04* (2006.01)
  *G01N 27/447* (2006.01)
  *H04L 29/06* (2006.01)
  *E21B 33/13* (2006.01)

(52) U.S. Cl.
  CPC ..... *G01N 27/44791* (2013.01); *H04L 9/0825* (2013.01); *H04L 9/0861* (2013.01); *H04L 9/0891* (2013.01); *H04L 9/321* (2013.01); *H04L 9/3247* (2013.01); *H04L 9/3263* (2013.01); *H04L 9/3268* (2013.01); *H04L 9/3297* (2013.01); *E21B 33/13* (2013.01); *H04L 63/08* (2013.01); *H04L 63/0823* (2013.01); *H04L 2463/121* (2013.01)

(58) Field of Classification Search
  CPC ..... H04L 9/3268; H04L 9/3297; H04L 63/08; H04L 63/0823; H04L 63/12; H04L 63/123; H04L 2463/121; G06F 21/572; G06F 21/575; G06F 21/64
  See application file for complete search history.

(56) References Cited

U.S. PATENT DOCUMENTS

| | | | | |
|---|---|---|---|---|
| 8,756,428 | B2* | 6/2014 | Touzeau | ............... H04L 9/3247 713/178 |
| 8,914,627 | B2 | 12/2014 | Park et al. | |
| 2002/0029350 | A1* | 3/2002 | Cooper | ............... H04L 12/1822 726/26 |
| 2004/0093499 | A1* | 5/2004 | Arditi | ................... H04L 9/3263 713/176 |
| 2007/0106912 | A1 | 5/2007 | Tanaka | |
| 2008/0229113 | A1 | 9/2008 | Yagawa | |
| 2009/0327741 | A1 | 12/2009 | Zimmer et al. | |
| 2015/0089238 | A1 | 3/2015 | Lewis | |
| 2016/0125187 | A1 | 5/2016 | Oxford | |
| 2016/0378970 | A1 | 12/2016 | Campbell et al. | |
| 2018/0109390 | A1* | 4/2018 | Spratte | ..................... H04L 9/30 |

FOREIGN PATENT DOCUMENTS

| | | |
|---|---|---|
| KR | 20100106110 A | 10/2010 |
| WO | 2018176125 A1 | 10/2018 |

OTHER PUBLICATIONS

Adams et al., RFC 3161—Internet X.509 Public Key Infrastructure Time-Stamp Protocol (TSP), The Internet Society, 2001.*
Search Report and Written Opinion for PCT application PCT/CA2018/050344, dated Jul. 13, 2018, 9 pages.
Extended European Search Report for EP Application 18778272.7 dated Nov. 18, 2020.
Nyström et al., "UEFI Networking and Pre-OS Security", Intel Technology Journal, 2011, pp. 80-101, vol. 15, No. 1.

* cited by examiner

METHOD AND APPARATUS FOR SECURE COMPUTING DEVICE START UP

CROSS REFERENCE TO RELATED APPLICATIONS

This application claims the benefit of priority to U.S. Provisional Patent Application Ser. No. 62/477,808 filed on Mar. 28, 2017 and entitled Method and Apparatus for Secure Computing Device Start Up, the contents of which are incorporated by reference.

FIELD OF THE INVENTION

The present invention pertains to the field of computing device security and in particular to a method and apparatus for secure computing device start up.

BACKGROUND

As is known, Secure Boot is a security standard developed by members of the PC industry to help ensure that a PC boots using only software that is trusted by the PC manufacturer. Secure boot is designed to attempt to prevent root kits from being installed at boot time in memory using mechanisms like option read only memory (ROM) and master boot records (MBRs) to get loaded in to the OS, hijacking system control and remaining hidden from anti-malware programs. This problem has grown over time to play a significant role in data loss/corruption and theft.

Unified extensible firmware interface (UEFI) is a standard of hardware/software interface for modern server platforms with modularity and standard interfaces for independent hardware vendors (IHVs) to develop device drivers in UEFI that work seamlessly in a pre-boot environment. UEFI adoption across operating systems and platforms continues to grow, with many of the major client and server OS versions supporting it.

The UEFI standards body identified a way to prohibit boot time malware root kits from being installed using a mechanism of loading and executing binaries that are un-modified and known to the platform. This mechanism is called Secure Booting.

Secured UEFI platforms load only software binaries, such as option ROM drivers, boot loaders, OS loaders, that are unmodified and trusted by the platform. The UEFI specification defines the infrastructure required for secure booting. Secure Boot does not protect the system or its data while the system is operating. Secure Boot stops booting to the OS if any component is not authenticated in the boot process, thereby attempting to prevent systems from running hidden malware.

UEFI platform firmware will load the third party drivers, option ROMS, and OS loaders that are signed by the Certification Authority (CA). Original equipment manufacturers (OEMs) can install the public part of the key in the platform database (DB) and the UEFI loader protocol service validates the signature of the binary against the authorized DB before it is allowed to run on the platform. This chain of authentication continues from the UEFI to the OS loader and OS. OS loaders that are signed and whose key is present in the DB are allowed to run based on UEFI. This key mechanism ensures that the OS loader or option ROMs are allowed to execute only if they are authorized and not modified by any party.

However, Secure Boot devices are challenged when it comes to certificate authentication in several aspects. Firstly, the root of trust for the secure boot process is permanently incorporated in the device. Secondly, there is no network connection available during the boot process to check certificate revocation status in real time, and thirdly there is no reliable real-time clock source available during the boot process to check certificate expiry.

Due to the above restrictions, if a malicious actor is able to acquire the private key associated with any level of the Secure Boot public key infrastructure (PKI), they will be able to sign malware that will be accepted by the Secure Boot device in perpetuity. As such, even though it is the root of trust that is permanently incorporated into the device, and the corresponding private key for that root can be very closely guarded, for example, stored offline in a locked and supervised vault with very strict policies and procedures regarding access to the vault, theft of the lowest level private key, which must be used frequently and is therefore inherently more vulnerable, can render the entire PKI compromised.

At present there are a few potential solutions to this problem. A first potential solution includes the use a certificate revocation list (CRL). For example, if a compromise of a signing key is detected, the intermediate certificate(s) can be revoked and added to a CRL that can be pushed to Secure Boot devices via firmware update. There are considered to be several potential issues with this solution. This solution implies that a compromise must be detected, which is not always true. In addition, it may take considerable time to push a CRL update out to potentially billions of Internet of Things (IoT) devices, thereby leaving a large window of opportunity for a malicious actor to exploit a stolen key.

Another potential solution is to have multiple roots of trust. Some processors provide multiple one-time-programmable registers (OTPRs) for storing roots of trust and a mechanism to invalidate expired/compromised roots. For example the Freescale iMX-6 provides 4 such OTPRs and fuses which can be blown to prevent reading of 3 of the 4 (the $4^{th}$ cannot be "revoked" in this manner because that would render the device unbootable). There are considered to be several potential issues with this solution. This solution implies that a compromise must be detected, which is not always true. In addition, it may take considerable time to push a CRL update out to potentially billions of IoT devices, thereby leaving a large window of opportunity for a malicious actor to exploit a stolen key. Furthermore, extra OTPRs can make a device more expensive and as such many IoT devices would not include this capability due to it being cost prohibitive. In addition, if the hacker is able to compromise one PKI they are likely able to compromise all of them, so there is a strong likelihood of concurrent compromise of all N roots.

Therefore there is a need for a method and apparatus for secure computing device start up that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

The present invention provides a method for secure computing device start up. The method includes generating a public/private key pair and signing a software image and obtaining a first time stamp and a second time stamp. The method further includes combining the signed software image, the first time stamp and the second time stamp into a bundle and deploying the bundle. During secure start up, the method includes authenticating the signed software image, the first time stamp and the second time stamp and booting the computing device if authentication passes. The computing device aborts booting the computing device if the authentication process fails.

Figure 1:
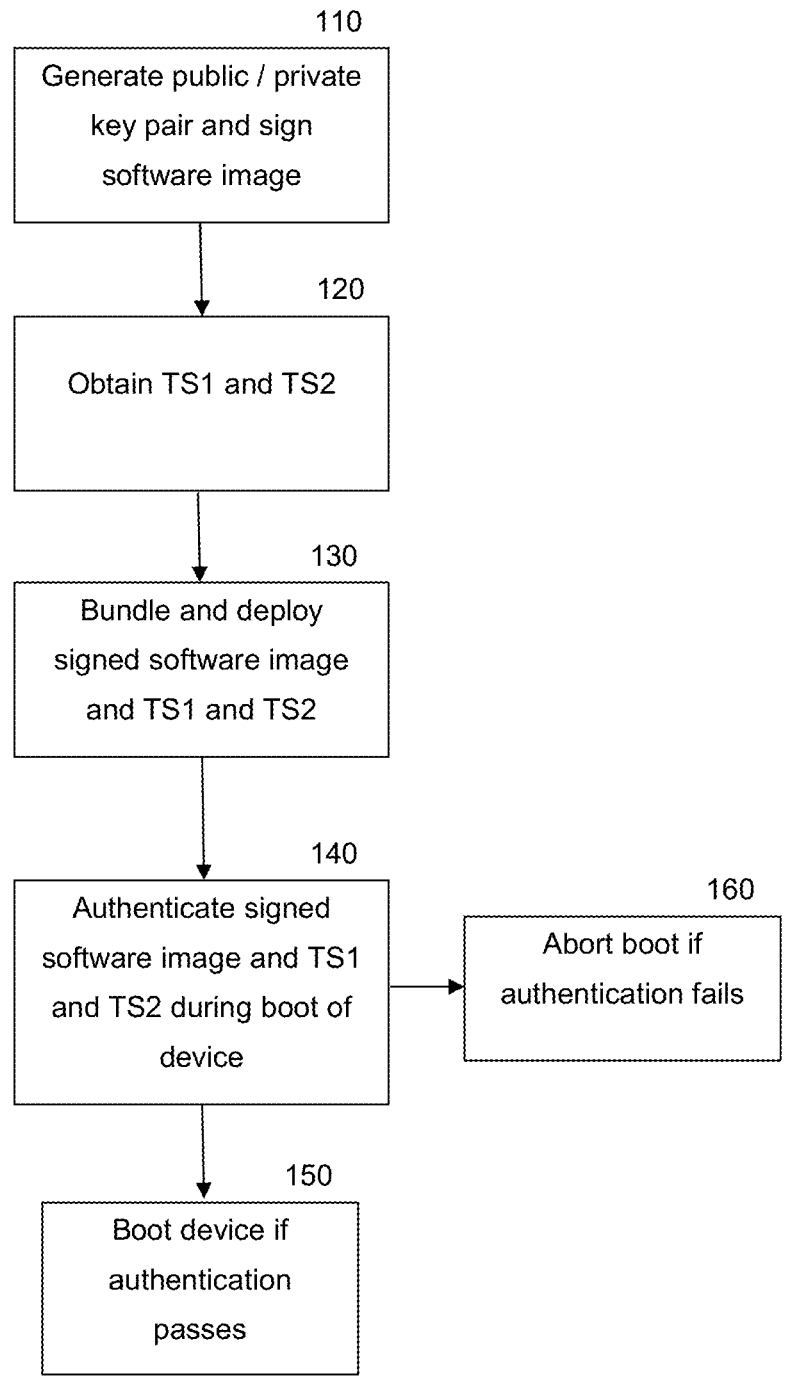
FIG. 1 illustrates a method of secure computing device start up in accordance with embodiments of the present invention.

FIG. 1 illustrates a method of secure computing device start up in accordance with embodiments of the present invention. As illustrated in FIG. 1, the overall secure start up of a computing device includes signing a software image for use during computing device start up and secure device start up based on the signed software image.

According to embodiments, there is provided a method for signing a software image for use during computing device start up. The method includes generating 110 a public/private key pair and signing a software image and obtaining 120 a first time stamp and a second time stamp. The method further includes combining the signed software image, the first time stamp and the second time stamp into a bundle and deploying the bundle 130.

According to embodiments, there is provided a method for secure computing device start up. The method includes obtaining a bundle, the bundle including a signed software image, a first time stamp and a second time stamp. During secure start up, the method includes authenticating the signed software image 140, the first time stamp and the second time stamp and booting 150 the computing device if authentication passes. The computing device aborts 160 booting the computing device if the authentication process fails.

According to embodiments, there is provided a device for signing a software image for use during computing device start up and a device for secure computing device start. Each of these devices include a processor and machine readable memory storing machine executable instructions which when executed by the processor configure the device to perform the respective method as defined above.

According to embodiments of the present invention, the method for secure computing device start up is intended to be used to improve the security of a Secure Boot procedure by limiting the window of opportunity a malicious actor has to sign malware that will be accepted by a Secure Boot device should the private signing key and associated certificate be stolen. According to embodiments, this method for secure computing device start up can be applicable to substantially all nature of devices that employ a Secure Boot feature. According to some embodiments, the method for secure computing device start up can be applicable to cellular modems or gateways or other communication network devices.

Figure 2:
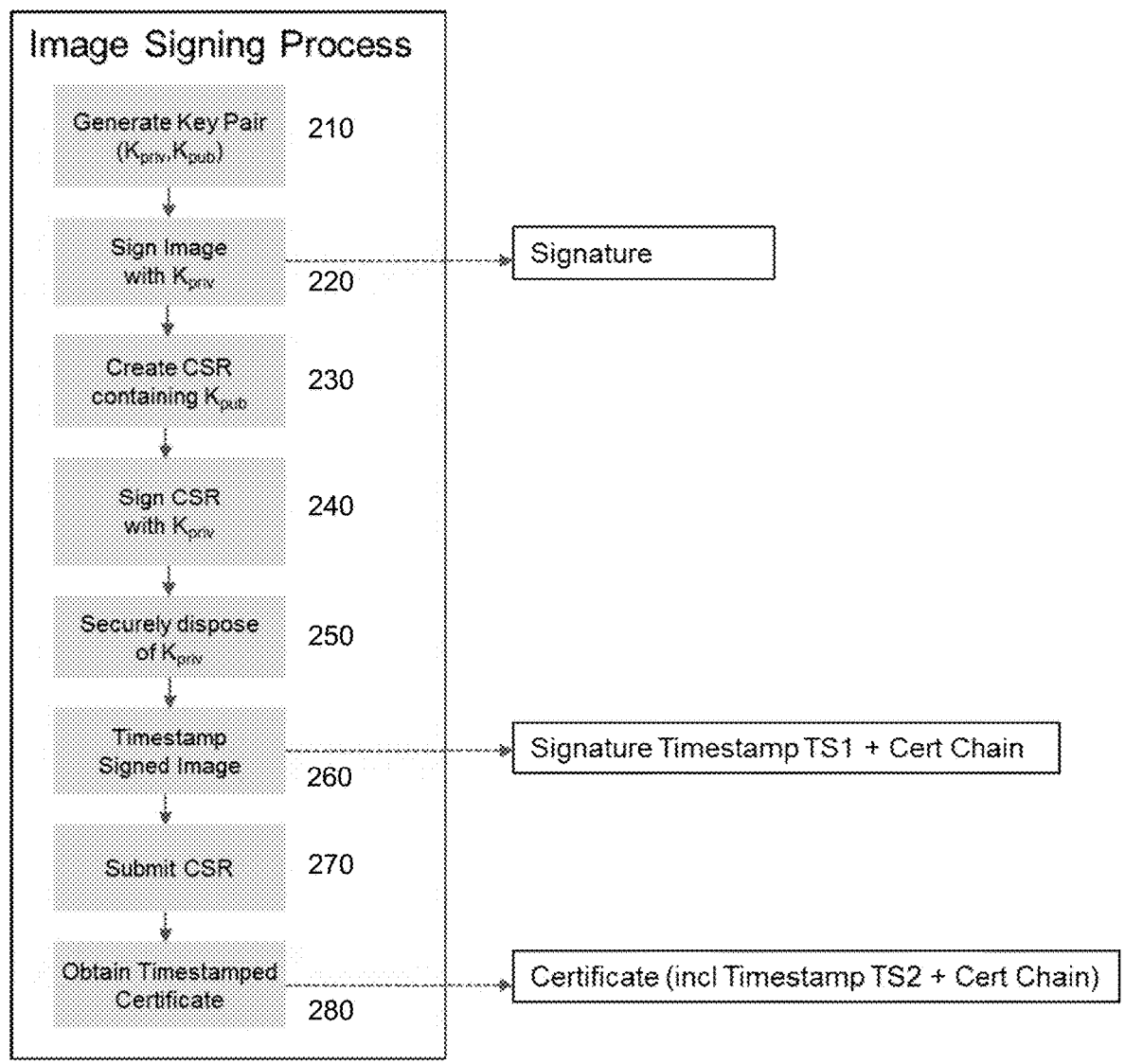
FIG. 2 illustrates a method for signing a software image, in accordance with embodiments of the present invention.

FIG. 2 illustrates a method for signing a software image for use during computing device booting according to embodiments of the present invention.

According to embodiments, the method for signing a software image for use during computing device booting can include the following steps. Initially, ephemeral private keys are used when a software image is to be signed. The method includes generation 210 of the ephemeral keys which includes generating a public/private key pair. The method further includes using the private key to sign 220 the software image. The subsequent step is to format a certificate signing request (CSR) which contains the public key 230 and signing the CSR using the private key 240. Subsequently the private key is discarded or destroyed 250. According to embodiments, it is considered to be critical that the private key is not committed to persistent storage.

According to embodiments, the method for signing a software image for use during computing device booting also includes computing a secure hash of the signed software image and submitting the hash to a time stamp authority (TSA) in order to acquire a first time stamp (TS1) 260. Subsequently, the CSR is submitted 270 to an intermediate certification authority (CA) and acquires 280 a time stamped signing certificate which has a second time stamp (TS2). Subsequently, the software image, software image certificate, TS1 and the certificate authentication chain are bundled. According to embodiments, the certificate authentication chain includes the signed certificate including TS2, the intermediate CA certificate (e,g, time stamped signing certificate) and the root CA certificate. This bundle is subsequently deployed for using during the start up or booting of a computing device.

Figure 3:
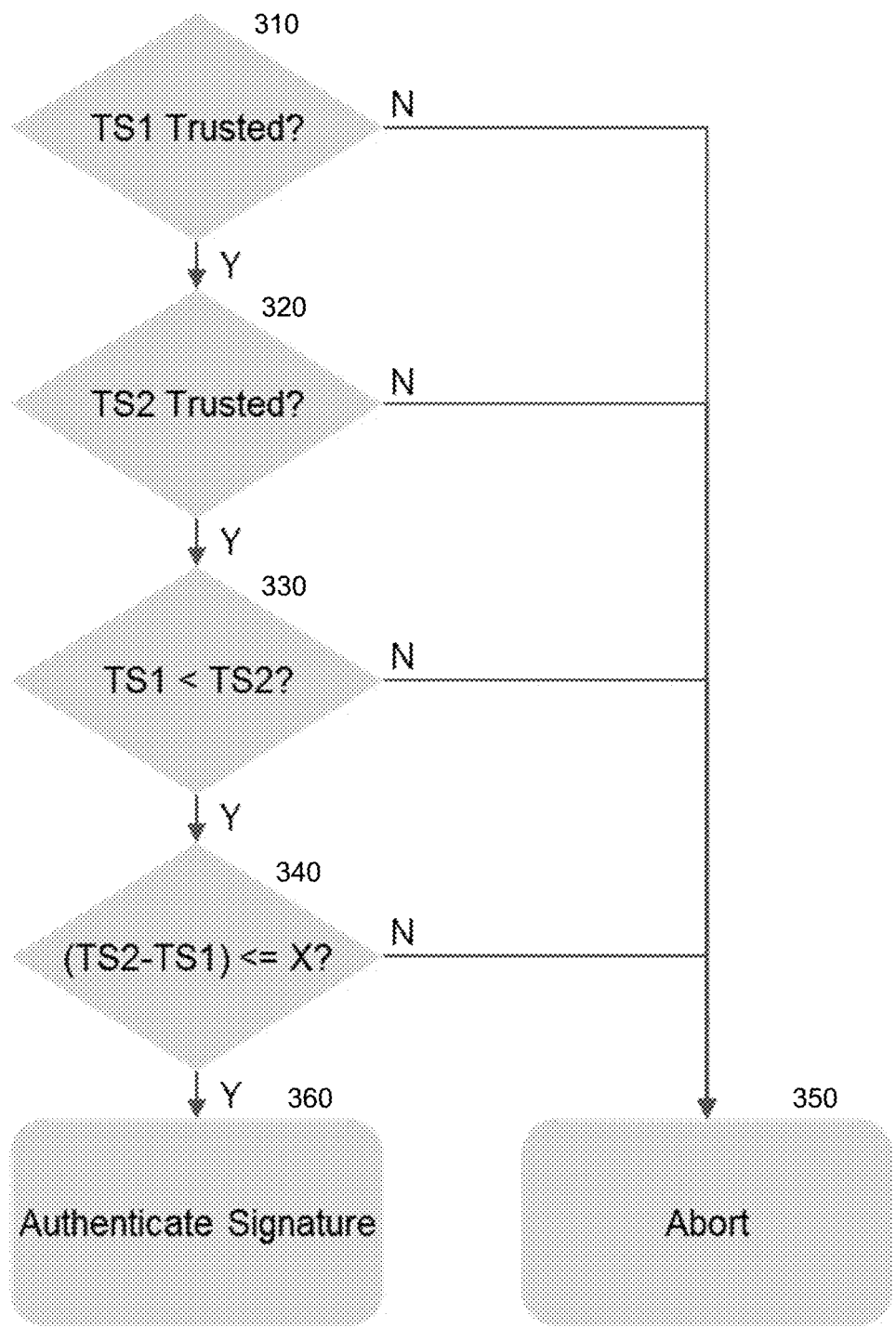
FIG. 3 illustrates a method of booting a computing device wherein the software image has been signed as illustrated in FIG. 1, in accordance with embodiments of the present invention.

According to embodiments, at the time of start up of a computing device, namely at boot time, and prior to authentication of the software image signature with the certificate chain, the following checks are performed, wherein the outcome of these checks determine if booting of the computing device is enabled or if booting of the computing device is aborted. FIG. 3 illustrates a method for secure start up of a computing device according to embodiments of the present invention.

According to embodiments, an initial check is to determine if TS1 is present and trusted 310. A pre-requisite of this check can be that the TSA root of trust is securely stored on the computing device for use in validation of TS1. If TS1 is not present or not trusted, then the booting of the computing device is aborted. If TS1 is present and trusted, the computing device proceeds to a subsequent check.

According to embodiments, a second check is to determine if TS2 is present and trusted 320. According to embodiments, it is expected that the same TSA will be used to generate both TS1 and TS2. According to embodiments, if the TSA providing TS1 is different from the TSA providing TS2, it is required that the two TSA roots of trust are securely stored on the computing device. If TS2 is not present or not trusted, then the booting of the computing device is aborted. If TS2 is present and trusted, the computing device proceeds to a subsequent check.

According to embodiments, a third check is to determine if TS1 is less than TS2 330. If TS1 is greater or equal to TS2, then the booting of the computing device is aborted. As defined above with respect to the method for signing a software image for use during computing device booting, TS1 is requested before TS2. As such TS2 must always be newer than TS1. For example, if TS1 is greater than TS2, it is a sign that TS1 was captured during its existence and was used to sign another software image. According to embodiments, this third check can ensure that the window of exploitation for a malicious actor to steal the signing keys is limited to the interval between the provision of TS1 and TS2.

According to some embodiments, there can be a fourth check to determine if booting of the computing device is to proceed. The fourth check includes a comparison between TS1 and TS2. According to embodiments, the fourth check includes evaluation of whether TS2 minus TS1 is greater than a predetermined value 340. If TS2 minus TS1 is greater than the predetermined value, the booting of the computing device is aborted 350 otherwise the booting 360 of the computing device can proceed. According to embodiments, this fourth check can determine if a malicious actor is able to stall the process of obtaining TS1 and TS2 to expand the window of exploitation (e.g. the time between the generation of TS1 and TS2) and this stalling of the process has a time frame longer than X, the certificate will not be accepted and the booting of the computing device is aborted. According to embodiments, the value of X can be defined by a security policy associated with the computing device, or an associated security policy of the method for secure computing device start up.

According to embodiments, the methods defined above can be extended to a variety of certificate-based authentication in order to assist in situations where a reliable clock source to check certificate expiry and/or a network connection to check certificate revocation status may not be available.

Figure 4:
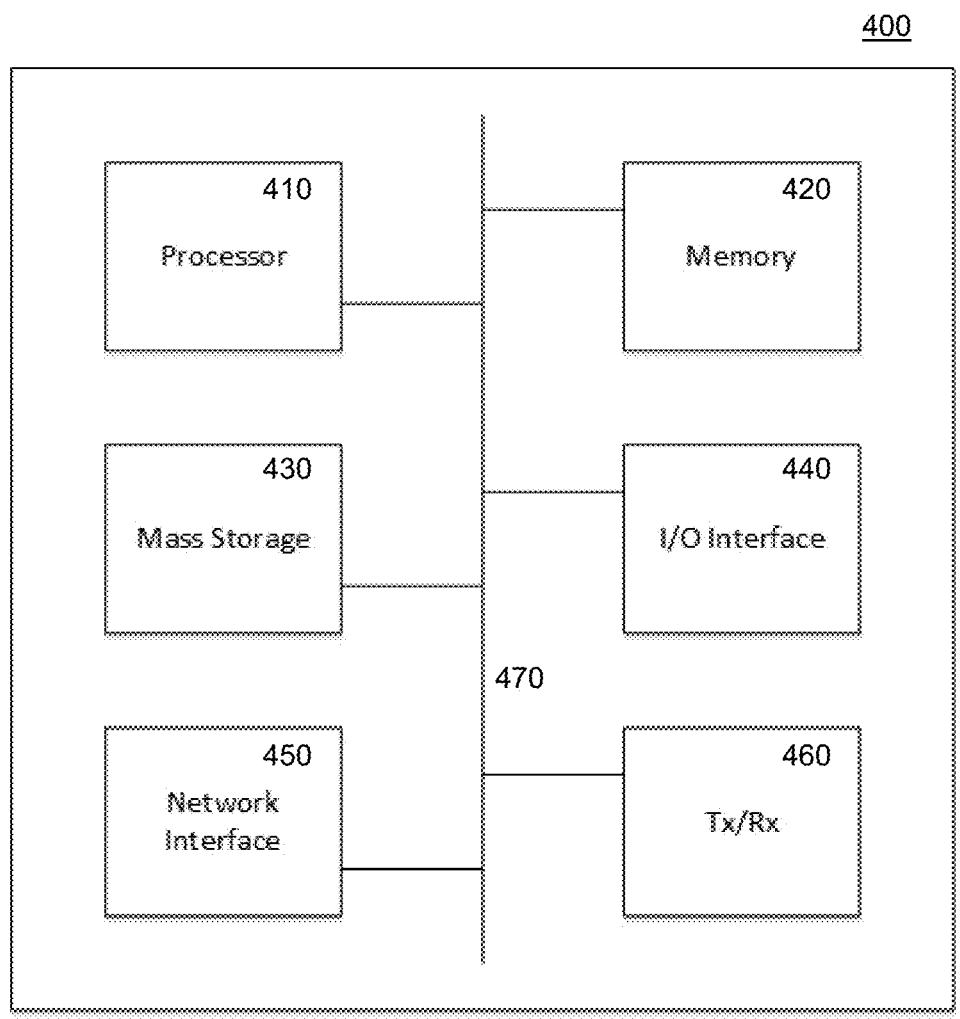
FIG. 4 is a schematic diagram of a hardware device, according to embodiments of the present invention.

FIG. 4 is a schematic diagram of a hardware device that may for example perform any or all of steps of the above methods and features described herein, according to different embodiments of the present invention. As shown, the device 400 includes a processor 410, memory 420, non-transitory mass storage 430, I/O interface 440, network interface 450, and a transceiver 460, all of which are communicatively coupled via bi-directional bus 470. According to certain embodiments, any or all of the depicted elements may be utilized, or only a subset of the elements. Further, device may contain multiple instances of certain elements, such as multiple processors, memories, or transceivers. Also, elements of the hardware device may be directly coupled to other elements without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage may have recorded thereon statements and instructions executable by the processor for performing any of the aforementioned method steps described above.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include a number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A method for secure computing device start up, the method comprising:
generating a public/private key pair and signing a software image using the private key of the public/private key pair;
obtaining a first time stamp and a second time stamp;
discarding or destroying the private key of the public/private key pair prior to obtaining the second time stamp;
combining the signed software image, the first time stamp and the second time stamp into a bundle;
deploying the bundle; during secure start up, authenticating the signed software image, the first time stamp and the second time stamp; and
booting the computing device if authentication passes.

2. The method according to claim 1, further including formatting a certificate signing request (CSR) which includes the public key of the public/private key pair and signing the CSR with the private key.

3. The method according to claim 1, wherein the first time stamp is received from a time stamp authority.

4. The method according to claim 1, wherein the second time stamp is received from an intermediate certification authority.

5. The method according to claim 1, wherein authenticating the signed software image includes determining if the first time stamp is present and trusted.

6. The method according to claim 5, wherein authenticating the signed software image includes determining if the second time stamp is present and trusted.

7. The method according to claim 6, wherein authenticating the signed software image includes determining if the first time stamp is less than the second time stamp.

8. The method according to claim 7, wherein authenticating the signed software image includes determining if the second time stamp minus the first time stamp is less or equal to a predetermined value.

9. The method according to claim 1, wherein the first time stamp and the second time stamp are obtained from a same time stamp authority.

10. A method for signing a software image for use during computing device start up, the method comprising:

generating a public/private key pair and signing a software image using the private key of the public/private key pair;

obtaining a first time stamp and a second time stamp;

discarding or destroying the private key of the public/private key pair prior to obtaining the second time stamp;

combining the signed software image, the first time stamp and the second time stamp into a bundle; and deploying the bundle for use during computing device start up.

11. The method according to claim 10, further including formatting a certificate signing request CSR) which includes the public key of the public/private key pair and signing the CSR with the private key.

12. The method according to claim 10, wherein the first time stamp is received from a time stamp authority.

13. The method according to claim 10, wherein the second time stamp is received from an intermediate certification authority.

14. The method according to claim 10, wherein the first time stamp and the second time stamp are obtained from a same time stamp authority.

15. A device for signing a software image for use during computing device start up, the device comprising:

a processor; and machine readable memory storing machine executable instructions which when executed by the processor configure the device to:

generate a public/private key pair and sign a software image using the private key of the public/private key pair;

obtain a first time stamp and a second time stamp;

discard or destroy the private key of the public/private key pair prior to obtaining the second time stamp;

combine the signed software image, the first time stamp and the second time stamp into a bundle; and deploy the bundle for use during computing device start up.

* * * * *